United States Patent [19]
Johnson

[11] 3,945,816
[45] Mar. 23, 1976

[54] METHOD FOR FORMING A REFRACTORY CELLULAR PRODUCT

[75] Inventor: Jerry Dean Johnson, Van Nuys, Calif.

[73] Assignee: Environ Control Products, Inc., Van Nuys, Calif.

[22] Filed: June 5, 1974

[21] Appl. No.: 476,666

[52] U.S. Cl. .......................................... 65/22; 65/31
[51] Int. Cl.² C03B 5/18; C03B 19/00; C03C 15/00
[58] Field of Search ............................ 65/31, 22, 20

[56] References Cited
UNITED STATES PATENTS

| | | | |
|---|---|---|---|
| 3,513,106 | 5/1970 | Chapman | 65/31 X |
| 3,574,655 | 4/1971 | Goldsmith | 65/22 X |
| 3,592,619 | 7/1971 | Elmer et al. | 65/22 |
| 3,630,700 | 12/1971 | Hammel | 65/22 X |
| 3,663,249 | 5/1972 | Rao | 65/22 X |
| 3,744,984 | 7/1973 | Sato | 65/22 |
| 3,758,284 | 9/1973 | Haller | 65/22 X |
| 3,782,915 | 1/1974 | Filbert et al. | 65/31 X |
| 3,785,793 | 1/1974 | Park | 65/31 |
| 3,792,987 | 2/1974 | Eaton | 65/31 X |
| 3,843,341 | 10/1974 | Hammel et al. | 65/22 |
| 3,881,944 | 5/1975 | Beal et al. | 65/31 X |

*Primary Examiner*—S. Leon Bashore
*Assistant Examiner*—Frank W. Miga
*Attorney, Agent, or Firm*—Trask & Britt

[57] ABSTRACT

A lightweight refractory foam primarily of silica can be formed from a phase-separable silicate glass such as borosilicate glass, by melting the glass, foaming the glass at elevated temperatures, phase-separating the silicate foam glass at elevated temperatures to form a silica-rich phase and a silica-poor phase and leaching said phase-separated foam glass with warm water or dilute acids to remove substantially the silica-poor phase. The resulting refractory foam consists essentially of a silica network. The density of the refractory cellular product may be from about 0.075 grams per cubic centimeter to 0.5 grams per cubic centimeter, or higher, as desired. The refractory cellular product has a very low coefficient of expansion and high chemical durability.

10 Claims, 3 Drawing Figures

A - SAMPLE IIIb
B - SAMPLE IIIa
  ◉ -INDICATES ONLY 2 HRS. HEAT TREATING AS PER CURVE 2 OF FIG. I
  ○ -INDICATES AN ADDITIONAL 2 HRS. HEATING AT 500°C
C - SAMPLE II   △ - SAMPLE II (a)   ▲ - SAMPLE II (b)

METHOD FOR FORMING A REFRACTORY CELLULAR PRODUCT

BACKGROUND OF THE INVENTION

Foam glass products have been known for a considerable time, as evidenced by the early patents to Haux, et al, U.S. Pat. No. 2,233,608; Ford, U.S. Pat. No. 596,669; U.S. Pat. No. 2,611,712; and Miller, et al, U.S. Pat. No. 2,233,631 wherein various chemicals and mechanical foaming processes are disclosed.

Recent interest in foam glass products is evidenced by the patents to Jones, et al, U.S. Pat. No. 3,459,565, wherein a foamable granular product is prepared by melting a glass in the presence of a gas under high pressure, thereafter cooling the glass so that upon reheating the glass will expand; to Marceau, U.S. Pat. No. 3,325,264, wherein glass is caused to foam by being heated to about 2000° farenheit which causes dissolved magnesium oxide to decompose and gasify; to Slayter, U.S. Pat. No. 3,151,966, wherein foaming is caused by the dissolution of dissolved gas due to the crystallization of the glass and to Schott, U.S. Pat. No. 3,628,937, wherein glass is foamed by the action of a paddle which disperses gas throughout the glass as it is leaving a melting tank.

Although foam glass products produced by techniques of the prior art are useful for many purposes, foam glass products have not been useful as insulation at elevated temperatures. Most glasses have a substantial coefficient of thermal expansion and the existence of a temperature gradient of any magnitude across the glass causes cracking or crazing. Refractory glasses are generally those which withstand high temperatures and have a low coefficient of thermal expansion. Refractory glasses, however, require melting and processing at very elevated temperatures, thus consuming a considerable amount of energy to melt and causing rapid degradation of the refractory linings of the melting and processing tanks.

One technique of making a refractory foam product is disclosed in U.S. Pat. No. 3,592,619 issued to Elmer, et al. In the patent a high-silica glass foam is produced by melting a borosilicate glass composition, phase-separating the glass into a silica-rich phase and a borate-rich phase, leaching the borate-phase from the glass to produce a porous, silica-rich body having a pore size in the range of about 10 to 25 angstroms, impregnating the porous body with an aqueous boric acid solution, particulating the impregnated glass, drying the particulated glass to remove excess water and foaming the particulated silica at an elevated temperature of about 1300° to about 1425°C to form a foamed refractory body.

The Elmer process involves several critical steps, as indicated by the patent, the first being the leaching step which must produce a very fine network of pores to entrap therein the moisture that serves to expand the glass upon heating. Therefore, the glass must be carefully heated during phase-separation to produce a borate phase of the correct dimensions and heating must be avoided prior to leaching to prevent growth of the borate phase. The leached and impregnated glass must be flash fired so that the pores are closed very rapidly to prevent escape of water vapor. The glass is then heated to a temperature of about 1300° to about 1425°C to cause the glass to decrease sufficiently in viscosity so that it can expand. Foaming of a product at temperatures of 1300°C and above requires processing equipment with a refractory lining. Since foaming occurs after leaching, the minimum density obtainable by Elmer's process is about 0.2 gm/cc, which is typical of glass foaming processes.

The process outlined in U.S. Pat. No. 3,592,619 is complicated and very time consuming in that a very large number of processing steps must be conducted to obtain a final product and the foaming of the final product must be done at very elevated temperatures in refractory lined equipment. Furthermore, because boric acid is introduced as a flux after leaching, the final product will not approach a pure silica content, as indicated by the thermal coefficient of expansion for Elmer's product of $8 \times 10^{-7}$ per °C as compared with $4 \times 10^{-7}$ per °C for pure silica. for pure silica.

INVENTION DESCRIPTION

A process has now been discovered whereby a refractory foam or cellular product substantially of silica may be produced in a few steps from a glass composition without requiring the glass to be subjected to temperatures in excess of about 850° C in any step subsequent to melting of the glass forming ingredients to form a leachable, phase-separable glass.

The process is practiced by first melting a leachable, phase-separable glass, particularly a borosilicate glass, and then foaming said glass at elevated temperatures to form a lightweight phase-separable foam glass. The foam glass is then phase-separated at elevated temperatures to form a silica-rich phase and a silica-poor phase, which in the case of a borosilicate glass is a borate-rich phase. The silica-poor phase is preferably present as a substantially continuous phase. The phase-separated foam glass is then leached with warm water or other aqueous leaching solution, e.g., dilute mineral acids, to remove the silica-poor phase from the glass to provide a cellular product consisting essentially of silica. The refractory foam consists of cells resulting from the foaming action and interconnecting pores resulting from leaching of the silica-poor phase. The density of the resulting refractory cellular product may be about 0.075 grams/cc to about 0.5 grams/cc, or higher. The refractory foam product has a very low coefficient of thermal expansion.

Drawings

The attached drawings illustrate certain processing steps wherein.

PROCESS DESCRIPTION

Glass Composition

Figure 1:
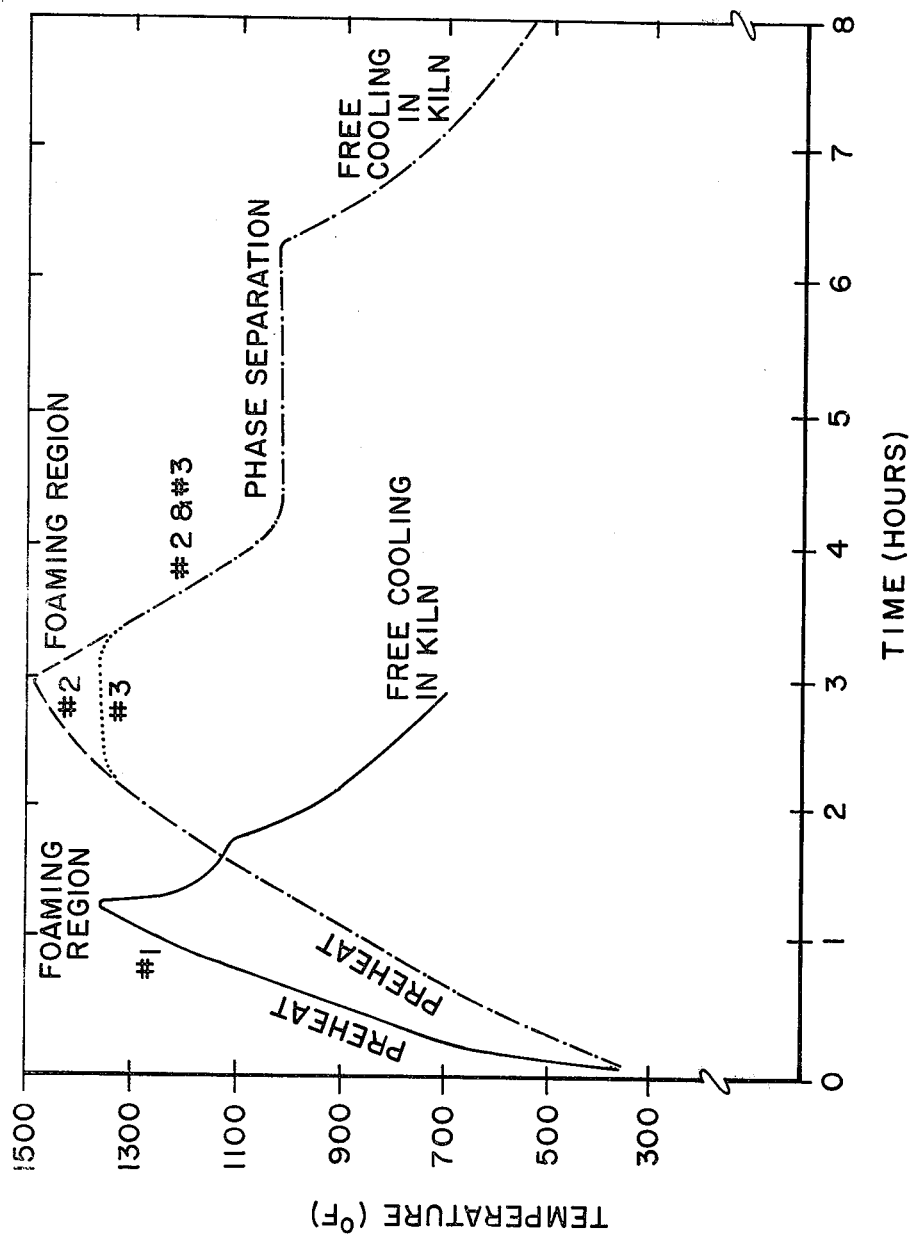
FIG. 1 is a graph illustrating the temperatures and time periods experienced when a glass body is foamed and phase-separated according to the techniques of the instant invention.

The process to produce a cellular refractory product utilizes any silica glass which may be phase-separated into a silica-rich phase and a leachable, silica-poor phase. Preferred glasses are those which have a melting point below about 1500°C and a softening point of below about 800° C.

Borosilicate glasses are one of the preferred glass compositions for producing a refractory foam substantially of silica. A typical borosilicate glass used in the invention is one having a silica content of about 40 to 90 percent by weight, a boric oxide content of about 10 to 50 percent by weight and a metal oxide flux content from about 3 to about 20 percent by weight. A preferred range of ingredients comprises from about 50 to 85 percent by weight silica, 10 to about 40 percent by weight boric oxide, and about 4 to 15 percent by weight of metal oxide flux. The metal oxide flux is typically an oxide of sodium, potassium or lithium although oxides of calcium, strontium, barium, lead, zinc, titanium or zirconium may be present instead of, or in addition to, the alkali metal oxide.

A preferred family of borosilicate glass composition for the purpose of this invention includes those wherein the silica content is about 60 to about 85 percent by weight, a $B_2O_3$ content of about 12 to about 35 percent by weight and an alkali metal oxide (preferably $Na_2O$, $K_2O$ or $Li_2O$) content of about 4 to about 15 percent by weight.

The soda, lithia and potassia borosilicates are particularly preferred inasmuch as the leachable phase phase-separates in the form of spinodal decomposition, i.e., it is vein-like or cord-like throughout the class in contrast to spherical or nucleated phase-separation. Thus, upon leaching of a glass having spinodal phase-separation occuring, the resulting product has tunnels therethrough.

The instant invention is particularly advantageous inasmuch as contaminated ingredients may be used in forming the phase-separable glass especially where such contaminates tend to concentrate in the leachable silica-poor phase and are therefore removed from the glass upon leaching.

A cheap source of silica and soda for use in the instant invention can be provided from waste glass, which is primarily bottle glass. As indicated, contaminants do not represent a substantial problem with regard to the instant invention.

Waste glass is primarily a soda-lime-silica glass, ranging from about 5 to 15% $Na_2O$, about 5 to 15 percent CaO and about 70 to 80 percent silica. Minor quantities of $K_2O$, MgO, BaO, $B_2O_3$ and other glass formers or fluxes may be present, thus providing a mixture of alkali metal oxides. Thus, the addition of proper proportions of boric oxide, e.g., 20 to 40 percent of the weight of the cullet, to a waste glass cullet provides a phase-separable borosilicate glass. The leachable phase is then an alkali metal-alkaline earth metalborate phase, e.g., a sodium-calcium-borate.

The components leached from the glass may be recovered and recycled, and through use of waste glass as a source of silica it may be possible to produce soda and calcia values for other purposes while continuously cycling $B_2O_3$.

Melting

The melting conditions for the phase-separable, foamable, leachable glass utilized in practicing the instant invention are typical. For example, phase-separable borosilicate glasses are generally melted at temperatures between 1200°C and about 1500°C. Certain precautions taken in forming glasses for optical purposes, for example, window glass and the like, such as fining, need not be done.

The molten glass may be quenched to form a frit which is then crushed to a powder for use with various chemical foaming agents to produce a foamed glass. Also, the molten glass may be foamed or cellulated as it leaves the melting tank, for example, by the method disclosed in the Schott patent, or the Miller, et al patent. In the event the molten glass is foamed as it leaves the melting tank, the foamed sheets of glass may be cut by laser, plasma arc flame or other appropriate means for cutting a hot glass body before being subjected to phase-separating techniques. Molten foam glass may be readily shaped into various articles, e.g., blocks, tubes, rods, cones and the like.

Foaming

Foaming may also be accomplished by heating particulate foaming agents with small glass particles having a particle size of up to about 1/16 inch although preferably the particle size is between about 5 mesh and 100 mesh or smaller. The foaming is generally accomplished in a cavity having the size and shape of the article which is to be produced. Typically, about 0.5 percent to about 5.0 percent of a foaming agent is uniformly mixed with the glass particles. Chemical foaming agents such as carbonates and sulfates of the various alkali and alkaline earth metals such as sodium carbonate, potassium carbonate, calcium carbonate, barium carbonate, strontium carbonate and the like, and sodium sulfate, potassium sulfate, calcium sulfate, barium sulfate, strontium sulfate, and the like, as well as carbonblack, sulphur and the like, the latter being utilized in conjunction with an oxidizing agent, may be utilized.

Foaming is accomplished by heating the mold or cavity in which the glass particles and foaming agent reside in intimate contact to a temperature of about 650°C to about 850°C for a period of a few minutes to about 4 hours and preferably for a period of about 15 minutes to about 2 hours, depending upon the size of the mold. The mold or cavity may be formed of steel, so long as the foaming temperature does not exceed about 850°C.

Phase-separation

The foamed glass, for example, a foamed borosilicate glass, may be phase-separated into a silica-rich phase and a silica-poor phase by subjecting the glass to a temperature between about 450°C to about 755°C and preferably from a temperature of about 480°C to about 520°C for a period of about ½ hour to about 4 hours. The phase-separation stage may be entered by the foamed glass after the foaming step without an intermediate cooling period, thereby conserving thermal energy. For example, foamed glass coming from the melting tank may be directed into the phase-separation zone wherein the temperatures are allowed to stabilize within the desired range so that phase-separation occurs. Also, phase-separation may be accomplished immediately after the foaming process without any intermediate cooling period. A distinct advantage of the instant process is that no intermediate cooling step is required before phase-separation and that phase-separation will always follow either the melting-foaming step or the separate foaming step, each of which yields a foamed product at an elevated temperature ready for phase-separation.

Certain borosilicate compositions, such as those in which the predominant amounts of fluxing ingredients are selected from the group consisting of alkaline earth metals, lead, zinc, titanium and zirconium, tend to phase-separate upon cooling, i.e., a separate heat treatment is not required. The borate phase in such glasses tends to be discontinuous and to leave only a small pore when leached. Phase-separable borosilicate glasses which are phase-separated at low temperatures for short periods of time tend also to have a discontinuous borate phase which leaves small pores when leached. The discontinuous borate phase requires more time in leaching and may not be completely leachable since some of the borate phase is totally surrounded by a chemically resistant, silica-rich phase.

Leaching

The phase-separated foamed glass has its silica-poor phase removed by leaching with warm water, preferably distilled; or dilute acids. The temperature of the leaching media is perferably from about 80°C to about 100°C or higher if the leaching solution is maintained under pressure. Leaching is conducted for about one hour to two days depending upon the size of the article being leached and the dimensions of the foamed pores and the original proportion of leachable phase. Generally, leaching can be accomplished in less than 8 hours.

The leaching solution may be slightly acidic to enhance leaching. Typical acidic leaching solutions comprise dilute solutions of hydrochloric acid, nitirc acid and sulfuric acid. Typical acid concentrations vary from about 0.1 Normal to about 1.5 Normal. Leaching with dilute acids reduces the leaching time by about 5 to 20 fold.

The leached glass is then dried, preferably under moderate conditions, for a period sufficient to remove substantially all the leaching solution. Whenever an acid leaching solution is utilized, the foam preferably undergoes a water rinse prior to drying.

The refractory foam produced according to the practice of the instant invention is unique in having a skeletal structure substantially of silica enclosing voids or cells caused by the action of a foaming agent. The cell walls formed by the skeletal silica structure have fine pores therein resulting from leaching of the silica-poor phase. These pores are generally interconnecting, i.e., are sufficiently continuous whereby one pore interconnects with another pore as one pore interconnects two cells.

The density of the foam product may be as low as 0.075 grams per cubic centimeter. Such foams are generally friable or weak, finding greatest utility as a high-temperature insulation in which substantial structured strength is not required. Foaming of conventional glass bodies has resulted in densities as low as 0.15 grams/cc; thus a borosilicate glass having a density of 0.15 grams/cc and a leachable borate phase comprising 50 percent of the glass body is theoretically leachable to produce a silica body having a density of 0.075 grams/cc.

Densities in the range of about 0.2 to about 0.5 grams/cc are readily obtained by practice of the instant invention. It is particularly significant that a lightweight refractory foam can be made without requiring processing at very elevated temperatures after the glass is initially formed.

The foam products of this invention have a very low thermal coefficient of expansion, e.g., about $4.0 \times 10^{-7}$ m/m°C, to about $10 \times 10^{-7}$ depending upon the final composition and can withstand temperatures up to its melting point, approximately 2900°F for long periods of time, e.g., in excess of four hours, without substantial loss of strength or structural integrity. The heat resistance and thermal conductivity can be affected by leaching, i.e., leaching can be conducted until substantially all the leachable phase is removed, thereby approaching a pure silica composition having a thermal coefficient of expansion of about $4.0 \times 10^{-7}$ m/m/°C. Preferred phase-separation and leaching techniques are followed to produce refractory foams with thermal coefficients of expansion of from about $4.0 \times 10^{-7}$ to about $6.0 \times 10^{-7}$ m/m/°C. Furthermore, the chemical durability of these foamed products is many fold, e.g., up to about fifteen fold, greater than the durability of typical glass foams.

The following examples are illustrative of the instant invention:

EXAMPLE I

A refractory foam was formed from the following materials:

| | |
|---|---|
| $SiO_2$ | 40 percent by weight |
| $B_2O_3$ | 50 percent by weight |
| $Na_2O$ | 10 percent by weight |

A glass was formed by melting these materials in a conventional manner, fritted by rapid cooling, and further crushed to a fine particle size. The powdered glass was thoroughly admixed with about 1 percent by weight of $CaCO_3$.

The $CaCO_3$ glass powder mixture was then introduced to a stainless steel mold having substantially greater volume than the volume of the $CaCO_3$ glass powder mixture. The mold was then heated (fired) in a kiln for a period of about 1½ hours to a temperature of about 750°C. Thereafter, the mold was allowed to cool gradually in the kiln.

The foam article was then heated at a temperature of about 500°C for about 4 hours to induce phase-separation of the sodium borate phase from the silica phase.

The resulting foam had cells approximately one-fourth inch as an average dimension. The foam was fragile after leaching.

The firing schedule of this material is illustrated in FIG. 1 as Curve No. 1.

EXAMPLE II

A second composition substantially identical to that of Example I was prepared and foamed in a similar manner to that of Example I.

The foam was then divided into two pieces which were phase-separated by different techniques.

Sample II(a) was heat treated at about 500°C for 8 hours while Sample II(b) was heat treated at 500°C. for about 2 hours.

Figure 2:
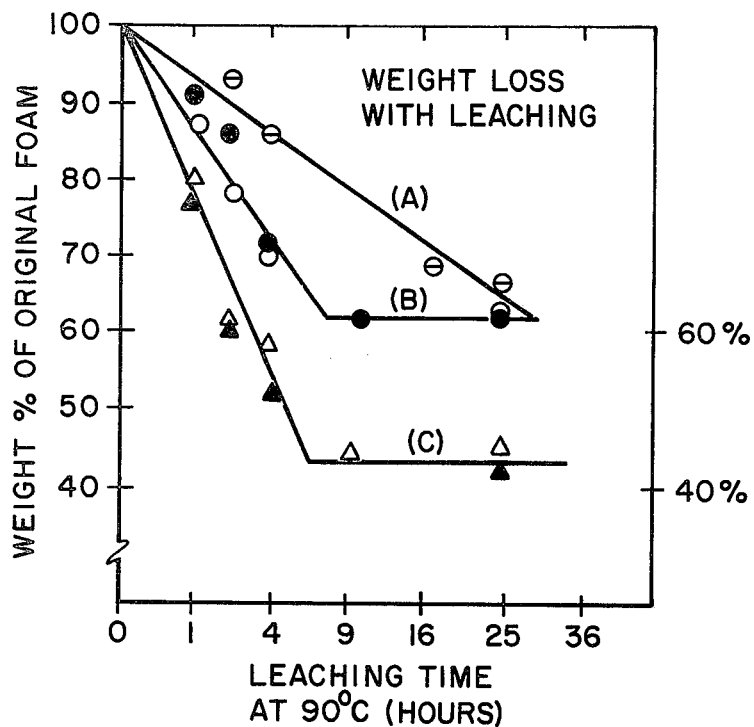
FIG. 2 is a graph illustrating the leaching of foamed glasses of various compositions in distilled water after various heat treatments.

The samples were then leached at 90°C. in distilled water, as illustrated in FIG. 2, Curve C. No significant difference was noted in the appearance and properties of the two samples. Each had cell dimensions about 1/16 inch and each was fragile after leaching. The thermal coefficient of expansion of each sample was about $5.0 \times 10^{-7}$ m/m/°C.

EXAMPLE III

A composition having a higher silica content was prepared from the following materials:

| | | |
|---|---|---|
| SiO₂ | 60 percent by weight | |
| B₂O₃ | 33.3 percent by weight | |
| Na₂O | 6.7 percent by weight | |

A glass was melted therefrom, fritted and crushed, as described in Example I. The further treatment of the glass is set forth in the following table:

TABLE I

| Sample No. | Weight % Foaming Agent | Firing Schedule Attached | Phase Separation | Remarks |
|---|---|---|---|---|
| IIIa | 2%CaCO₃ | Curve No. 2 FIG. 1 | Two types (a) 550°C 2 Hrs after foaming (b) Additional 500°C 2 Hrs | Max. Foam. Temp.: 8.0°C Avg. Foam Pore Size: 1/4" Leaching - See FIG. 2 |
| IIIb | 1%CaCO₃ | Curve No. 3 FIG. 1 | 550°C 2 Hr while cooling from foaming Temp. | Max. Foam Temp. 735°C Avg. Foam Pore Size: 1/16 – 1/8" Leaching-See FIG. 2 -Leached Density .25g/c |

As can be discerned from FIG. 2, Sample IIIb without additional heat treating other than cooling in the kiln, as illustrated in FIG. 1, Curve 3, leached more slowly than Sample IIIa, which was similarly treated. Sample IIIa had more blowing agent in the composition, indicating a larger pore size and lower density.

As illustrated in FIG. 2, a high silica glass (60% silica - Sample IIIa) which had a larger quantity of foaming agent, produced a foamed glass from which the leachable phase was more quickly leached than the same glass (Sample IIIb) which had been foamed with one-half as much blowing agent. A low silica glass (40% silica - Sample IIa) was completely leached (Curve C, FIG. 2) in about the same time as Sample IIIa even though about twice as much leachable phase was present and only one-half as much blowing agent utilized.

Figure 3:
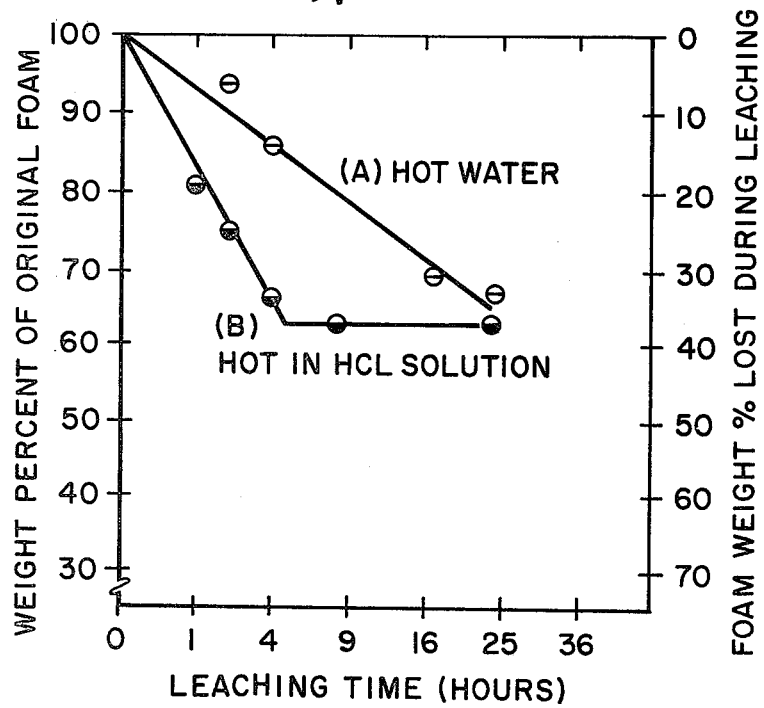
FIG. 3 is a graph comparing leaching of a foamed glass in water and dilute hydrochloric acid.

A comparison of water leaching with acid leaching is illustrated in FIG. 3 wherein Sample IIIb was leaching in hot water and hot HCl (1 Normal solution). The acid leaching was about 6 times faster than the water leaching. As shown in FIG. 2, Sample IIIb was a difficult glass to leach, thus proportional decreases in leaching times result when leaching more easily leached glasses with an acid solution.

I claim:

1. A method of forming a lightweight refractory foam substantially of silica comprising:
    a. mechanically foaming a molten phase-separable alkali metal borosilicate glass having a borate content which separates into a silica-poor, borate-rich phase,
    b. maintaining the temperature of the foamed glass between about 450°C and about 755°C to separate said glass into a silica-rich phase and a silica-poor, borate-rich, leachable phase,
    c. cooling said glass below 450°C, and
    d. leaching said foamed, phase-separated glass with an aqueous medium for a period sufficient to remove substantially all of said borate-rich phase to yield a lightweight refractory foam substantially of silica.

2. A method of forming a lightweight refractory foam substantially of silica comprising:
    a. chemically foaming a molten phase-separable alkali metal borosilicate glass having a borate content which separates into a silica-poor, borate-rich phase by heating a mixture of said alkali metal borosilicate glass and a chemical foaming agent in a cavity until a cellular glass is produced,
    b. maintaining the temperature of the foamed glass between about 450° and about 755°C to separate said glass into a silica-rich phase and a silica-poor, borate-rich, leachable phase,
    c. cooling said glass below 450°C, and
    d. leaching said foamed, phase-separated glass with an aqueous medium for a period sufficient to remove substantially all of said borate-rich phase to yield a lightweight refractory foam substantially of silica.

3. The method of claim 2 wherein the glass additionally contains an alkaline earth oxide.

4. A process of claim 2 wherein the phase-separable alkali metal borosilicate glass comprises less than about 20 percent by weight alkali metal oxide, about 10 percent to about 50 percent by weight boric acid and about 40 percent to about 85 percent by weight silica.

5. The process of claim 4 wherein the alkali metal oxide is soda.

6. The process of claim 4 wherein the alkali metal oxide is a mixture of alkali metal oxides.

7. A method of claim 2 wherein the alkali metal borosilicate glass is a mixture of finely ground glass and a chemical foaming agent.

8. The method of claim 2 wherein said chemical foaming agent is selected from the class consisting of calcium carbonate, strontium carbonate, barium carbonate, calcium sulfate, barium sulfate and strontium sulfate.

9. The method of claim 2 wherein foaming of said glass occurs by heating of said glass to a temperature of about 650°C to about 850°C.

10. The method of claim 2 wherein phase separating occurs by maintaining the temperature of said glass between about 450°C and 755°C for a period of about ½ to about 5 hours.

* * * * *